UNITED STATES PATENT OFFICE.

RENÉ BOHN, OF LUDWIGSHAFEN-ON-THE-RHINE, BAVARIA, ASSIGNOR TO THE BADISCHE ANILIN AND SODA FABRIK, OF MANNHEIM, GERMANY.

ALIZARINE-BLUE SULPHURIC ACID.

SPECIFICATION forming part of Letters Patent No. 399,481, dated March 12, 1889.

Application filed October 18, 1888. Serial No. 288,432. (Specimens.)

*To all whom it may concern:*

Be it known that I, RENÉ BOHN, a citizen of Switzerland, residing at Ludwigshafen-on-the-Rhine, in the Kingdom of Bavaria and Empire of Germany, have invented new and useful Improvements in the Manufacture of Alizarine-Blue Sulphuric Acid, of which the following is a specification.

My invention relates to the manufacture of an improved dye-stuff or coloring-matter produced by the limited or moderate action of sulphuric anhydride upon alizarine-blue.

My improved dye-stuff or coloring-matter is termed "alizarine-blue sulphuric acid," in order to indicate by this name both its origin and its chiefly available property of splitting up into alizarine-blue and sulphuric acid when submitted to the influence of acids or acid mordants in the processes of dyeing or printing.

In carrying out my invention I proceed as follows: About ten parts, by weight, of dry and finely-powdered alizarine-blue are, in small portions at a time and under constant stirring, added to about twenty parts, by weight, of fuming sulphuric acid containing about twenty-three per cent. of free anhydride. This operation, which requires about from four to six hours, being finished, the mixture or solution thus obtained is to be kept agitated at a temperature of about 50° centigrade during the space of about from four to five hours, in order to insure a perfect dissolution of the alizarine-blue, and then the conversion of the latter into its sulphuric-acid derivative is to be completed by continuously agitating the solution at an ordinary temperature during about another twelve hours. Throughout this operation the access of moist air ought to be carefully excluded. The result of the process is then gradually poured into a mixture of ice and water, and the precipitate of alizarine-blue sulphuric acid thus produced is to be filtered as quickly as possible, washed with ice-cold water, and pressed.

In order to convert the free and unstable alizarine-blue sulphuric acid into a commercial product soluble in water and possessing a sufficient degree of stability, it is advisable to prepare the alkaline salts of the same by the application of the known methods—for instance, by mixing the free alizarine-blue sulphuric acid obtained as above described in the state of a pressed pulp with as much of a diluted caustic-soda liquor as will be required for converting the same into a purple crystalline salt, presenting the appearance of pure indigotine. The sodium salt of the coloring-matter thus prepared may then be obtained in a dry state by evaporation.

Alizarine-blue sulphuric acid produced as above described presents the following characteristic properties: It is capable of forming two series of alkaline salts soluble in water. Those containing the minimum of alkali exhibit a yellow or brown appearance both in the dry state and in the state of their concentrated aqueous solutions, while a larger proportion of alkali effects a change of the said colors into purple or blue. The purple solution of the potassium or sodium salts assumes gradually the before-named yellow or brown tint upon the addition of water. A similar change (owing to an abstraction of alkali) takes place by carefully adding a small amount of a mineral or organic acid or by passing a current of carbonic acid into the said purple solutions. This point being reached, a further addition of a mineral or organic acid causes the alizarine-blue sulphuric acid thus set free to become precipitated in alizarine-like yellow flocks, which quickly assume a crystalline appearance. By the simultaneous application of heat the above-named decomposition ensues, alizarine-blue and sulphuric acid being the result. This decomposition forms an especially striking experiment if acetic acid be employed for such purpose, the solution becoming decolorized, while alizarine-blue separates out in small glittering crystals closely resembling artificial indigo. By employing sulphuric or hydrochloric acids in sufficient excess the well-known red solutions of the corresponding salts of alizarine-blue will be observed to form. The alkaline solutions of alizarine-blue sulphuric acid are precipitated by caustic and carbonated alkalies as well as by common salt. Alkaline-reducing agents—such, for instance, as zinc-dust and caustic-potash liquor—cause the purple color of the alkaline solutions of alizarine-blue sulphuric acid to change into a yellow tint, which, upon the access of air, changes back into the original purple hue. Alizarine-blue sulphuric acid is chiefly useful for dyeing wool or other animal fiber with the aid of mordants used for the production of the variously-colored lakes of alizarine-blue. On account of sulphuric acid becoming liberated during its decomposition, as above described, it is less suitable for the printing of cotton than the before-mentioned bisulphite compounds of alizarine-blue.

What I claim as new, and desire to secure by Letters Patent, is—

As a new product, the coloring-matter or dye-stuff (alizarine-blue sulphuric acid) hereinbefore described, and having the following characteristics: It is capable of forming two series of alkaline salts, those containing the minimum of alkali exhibiting a yellow or brown appearance, while a larger proportion of alkali effects a change of the said color into purple or blue; by adding to the purple solution a small amount of mineral or organic acid it assumes gradually the before-named yellow or brown tint; by the further addition of a mineral or organic acid the alizarine-blue sulphuric acid becomes precipitated in alizarine-like yellow flocks, and it dyes wool or other animal fiber with the aid of mordants blue.

In testimony whereof I have hereunto set my hand in the presence of two subscribing witnesses.

RENÉ BOHN.

Witnesses:
AUGUST HANSE,
JOHANNES BÜTTNER.